United States Patent [19]

Goto

[11] 4,339,812
[45] Jul. 13, 1982

[54] SIGNAL PICKUP CARTRIDGE FOR REPRODUCING SIGNALS RECORDED ON ROTATING RECORDING MEDIUMS

[75] Inventor: Kunio Goto, Yokohama, Japan

[73] Assignee: Victor Company of Japan, Ltd., Yokohama, Japan

[21] Appl. No.: 136,741

[22] Filed: Apr. 2, 1980

[30] Foreign Application Priority Data

Apr. 4, 1979 [JP] Japan .................................. 54/40654

[51] Int. Cl.³ .............................................. G11B 3/20
[52] U.S. Cl. .................................................... 369/170
[58] Field of Search ............................. 369/126, 170; 358/128.5, 128.6; 360/10, DIG. 1

[56] References Cited

U.S. PATENT DOCUMENTS

| 3,904,837 | 9/1975 | Sugimoto et al. | 369/170 |
| 4,040,635 | 8/1977 | Leedom | 369/170 |
| 4,160,268 | 7/1979 | Goto et al. | 358/128.6 |

Primary Examiner—Charles E. Phillips
Attorney, Agent, or Firm—Louis Bernat

[57] ABSTRACT

A signal pickup cartridge is mounted in a signal pickup device having pivot bearings and an actuator driven by the pivot bearings in response to a control signal. The pickup cartridge comprising a cantilever provided at a distal free end thereof with a reproducing stylus for tracing along a track which is formed on a rotary recording medium lying in a horizontal plane and has an information signal recorded therealong and thereby reproducing the information signal. The cantilever is supported at a proximal base end thereof by the pivot bearings in a swingable manner and, moreover, in a manner making possible displacement thereof in the longitudinal direction thereof. The pickup cartridge further comprises pressure contact mechanism for holding the cantilever when the pickup cartridge is in the state thereof prior to the mounting thereof in the signal pickup device and for causing the proximal base end of the cantilever to be pressed into contact with the pivot bearing when the pickup cartridge is in the mounted state in the pickup device, and elastic members capable of absorbing vibration provided at one part of the pressure contact mechanism and holding the cantilever at a part thereof near the proximal base end.

4 Claims, 13 Drawing Figures

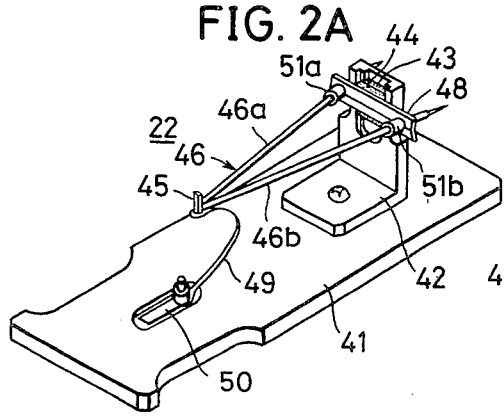
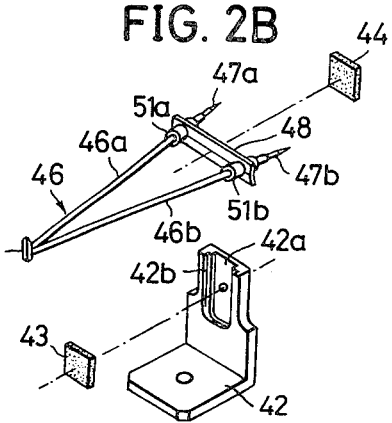
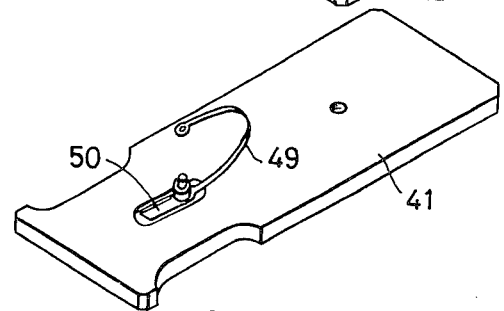
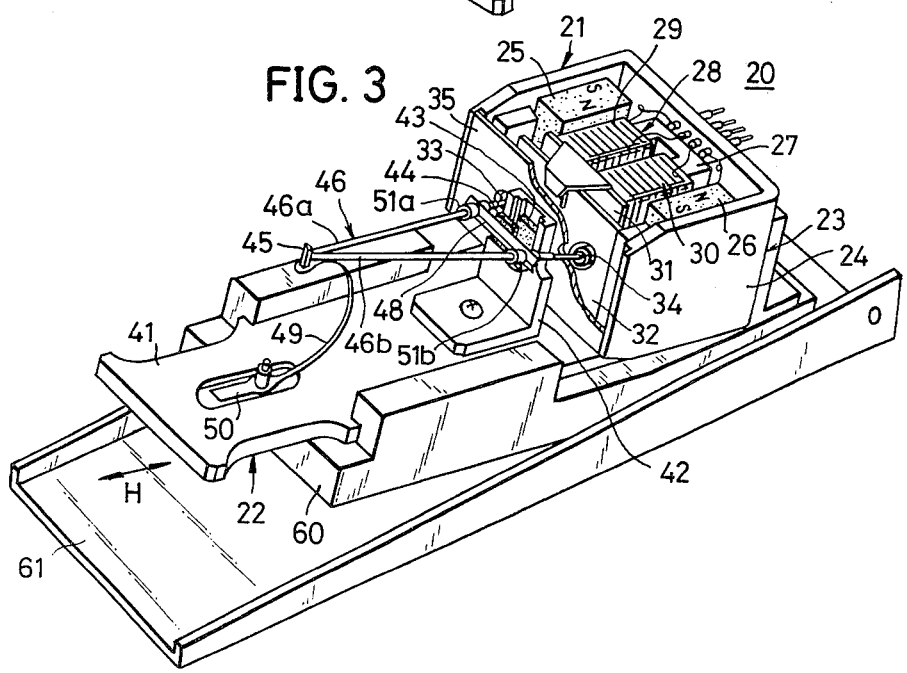

SIGNAL PICKUP CARTRIDGE FOR REPRODUCING SIGNALS RECORDED ON ROTATING RECORDING MEDIUMS

BACKGROUND OF THE INVENTION

The present invention relates generally to signal pickup cartridges for reproducing signals recorded on rotary recording mediums. More particularly, the invention relates to a signal pickup cartridge in an apparatus for reproducing an information signal recorded on a rotary disc along a spiral or concentric track. The invention effectively suppresses the deflective resonance of a cantilever on the free end of which a signal reproducing element, such as a reproducing stylus, is mounted.

Heretofore, there have been developed apparatuses of the type wherein, for example, a rotary disc (referred to as "disc" hereinafter) has a video signal recorded on a spiral track as variations in the geometrical shapes corresponding to an information content. This spiral track is formed on a flat plane and has no stylus guide groove. A signal reproducing stylus of a signal pickup device traces the spiral track to reproduce the recorded video signal. In a signal pickup device of this character, it is necessary that the signal pickup device trace the track accurately, since the track has no stylus guide groove. For this reason, it is necessary to provide means for detecting any tracking deviation of the signal pickup device relative to the above mentioned track on the disc and for controlling, in response to this error, the position of the signal pickup device so that it will trace accurately over the track to accomplish a tracking control.

At the time of the production of a disc, mechanical deformation (distortion) therein cannot be avoided, and even when it is rotated at a constant speed at the time of its reproduction, variations arise in the relative speed between the recorded track and the reproducing stylus. This gives rise to jitter (error in the time axis) in the reproduced signal.

The present applicant has previously proposed a signal pickup device in which a permanent magnet member of the shape of a rectangular parallelepiped and having magnetic poles on the opposite lateral faces thereof is fixed to the proximal end of a cantilever. A first coil is disposed to surround the permanent magnet member. Second coils are disposed to confront each magnetic pole of the permanent magnet member. In this device, when the tracking control signal current and the jitter compensation signal current respectively flow through the first coil and the second coils, the permanent magnet member is energized to rotate about ahypothetic vertical axis thereof and to displace in the longitudinal direction thereof, according to Fleming's lefthand rule, whereby the cantilever is rotated and displaced in the axial direction of the cantilever. Tracking control and jitter compensation are thereby carried out.

This signal pickup device, however, is accompanied by following problems, due to its construction. The permanent magnet member, which is a moving member, must be miniaturized and light-weight, which inevitably causes a small magnetic force. Accordingly, the driving force of the permanent magnet member becomes small, whereby the operation of the cantilever with large driving force becomes difficult. Difficulties occur and the prescribed control operation cannot be performed.

Furthermore, since the reproducing stylus becomes worn with use over a long time, it is necessary that the cartridge be of an interchangeable construction wherein the cantilever carrying the reproducing stylus can be readily attached to or detached from a control drive part or an actuator part having coils.

The present applicant has developed a signal pickup device in which three coils are connected to the proximal part of a cantilever and are disposed within a magnetic field developed by a stationary permanent magnet member. Two coils among three coils are subjected to a torque when a tracking control signal current flows therethrough. The remaining coil is subjected to displacement in the winding axial direction when a jitter compensation signal current flows therethrough. The tracking control and jitter compensation are effectively carried out, as shown in detail in the U.S. Pat. No. 4,160,268.

The pickup cartridge of this previously developed pickup device incorporates a mechanism which presses the proximal part of a cantilever against a pivot bearing mounted to the moving coils to engage with the pivot bearing. A mechanism has a damper, which does transmit force at the time of jitter compensation. The mechanism applies a stylus pressure to hold a reproducing stylus against the disc.

In the reproducing operation of the above described signal pickup device, a vibration accompanying stick-slips produced during the sliding contact between the reproducing stylus and the disc and a vibration generated by the driving power imparted to the control driving part including coils are applied to the cantilever of the cartridge. For this reason, the cantilever undergoes deflective vibration at the natural resonance frequency of its deflective mode.

Because of this deflective vibration of the cantilever and because of the great mass of the cantilever and parts accessory thereto and for other reasons, the following-up characteristic of the cantilever with respect to the disc is poor at high frequencies such as, for example, above 1 KHz. Consequently, when the cantilever undergoes the above mentioned deflective vibration, the reproducing stylus tends to separate from the disc surface at a number of specific vibration frequencies. The envelope of the reproduced signal fluctuates in response to the contacting state of the reproducing stylus with respect to the disc surface.

More specifically, when the reproducing stylus separates slightly from the disc surface, the level of the reproduced signal becomes lower. In the case where the degree of separation of the reproducing stylus from the disc surface is great, a signal dropout occurs in the reproduced signal. The higher the frequency of the component of the information signal, the greater is the effect of this separation of the reproducing stylus from the disc surface. When there is a deterioration of the frequency characteristics due to inflection of the envelope of the reproduced signal, dropouts, and the like in this manner, the quality of the reproduced signal is markedly impaired.

Furthermore, when the reproducing stylus skips over the disc surface and repeatedly separates away from and drops onto the disc surface, scaly scuff marks are formed on the disc surface as a result of the impact imparted thereto each time the stylus drops onto the disc surface.

Still another problem arises in the case where minute undesirable convexities exist on the disc surface. In this case, the separation time of the reproducing stylus from the disc surface becomes longer because of these convexities. Furthermore, since the transient characteristic is not good, the stylus skips a number of times on the disc surface. In this case, also, undesirable results such as deterioration of the quality of the reproduced signal, dropouts, and damaging of the disc surface are incurred similarly as described above.

A further difficulty occurs when the cantilever is controlled and driven by the control drive part, at which time the cantilever is subjected to a vibromotive force, whereupon undesirable phenomena such as skipping of the reproducing stylus on the disc surfce and vibrational contacting and separating of the base or proximal end of the cantilever relative to the pivot bearing, which give rise to variation of the contacting state of the stylus with respect to the disc surface occur in some instances. These phenomena readily occur particularly in the case where the driving speed of the control drive part is high.

In particular, in the tracking control system, in order to compensate for phase delay of the drive system, a drive signal whose high-frequency band has been accentuated is supplied to the control drive part. For this reason, the stylus separates from the disc surface, and a dropout occurs in the reproduced signal at a specific frequency where a standing wave produces with a deflective vibration in the cantilever.

The above described phenomena readily occur particularly in cases where the reproducing stylus shifts from track to track within a short time at the time of a special reproducing mode. Examples of such special reproducing modes are the still-motion reproduction mode in which the same track on a disc on which a video signal is recorded is repeatedly reproduced, the high-speed or quick-motion reproduction mode in which the stylus reproduces by riding over one or a plurality of tracks, and the reverse reproduction mode in which the stylus reproduces as it rides over tracks in the reverse radial direction of the disc.

Accordingly, attempts have been made to suppress the deflective vibration of the cantilever by providing an annular rubber damper between an intermediate part of the cantilever and the base plate of the cartridge. The deflective vibration of a cantilever, however, has a relatively high frequency of, for example, 1 KHz or higher. For this reason, it is necessary that the elastic constant (i.e., stiffness S) of the rubber damper be large in order that it will function as an elastic member in the above mentioned frequency band.

However, in the case where a member having a great stiffness is used as a rubber damper, the contact force of the reproducing stylus against the disc surface when considered statically becomes a force far greater than a preferable force 50 mg because of this rubber damper, whereby there is the risk of the disc surface being damaged. On the other hand, if the stiffness of the rubber damper is so selected as to prevent the contact force of the stylus against the disc from becoming excessively greater than a desired value, the rubber damper will not function effectively as a damper at the above mentioned frequency band of the deflective vibration, and the provision of the rubber damper will merely be an addition of a surplus mass to the cantilever. Thus, the deflective vibration cannot be effectively suppressed by means of the above mentioned annular rubber damper.

SUMMARY OF THE INVENTION

Accordingly, it is a general object of the present invention to provide a new and useful signal pickup cartridge which is an improvement of the above described previously developed pickup device, and in which the above described difficulties have been overcome.

Another and specific object of the invention is to provide a signal pickup cartridge in which an elastic member having the capability of absorbing vibration is provided at the part of connection between a cantilever provided at its outer tip with a reproducing element and a member constituting means for imparting pressure contact force of the reproducing element relative to a rotary recording medium to the cantilever. In the signal pickup cartridge according to the present invention, the deflective vibration of the cantilever at a relatively high frequency band can be effectively suppressed. At a high vibration frequency band, only the cantilever moves, and the effective mass of the movable parts may be considered to be small. Therefore, the following-up performance with respect to the pivot bearing provided at the control drive part of the base part of the cantilever and the following-up performance with respect to the disc surface of the reproducing element are excellent. For this reason, skipping of the reproducing element on the disc surface, separating and contacting of the cantilever base part and the pivot bearing, and other undesirable action are prevented. As a result, fluctuation of the level of the reproduced signal, occurrence of dropout, damaging of disc surface, etc., are effectively prevented. Furthermore, these undesirable phenomena are effectively prevented also during shifting of the reproducing element between tracks at the time of a special reproducing mode.

Other objects and further features of the present invention will be apparent from the following detailed description with respect to preferred embodiments of the invention when read in conjunction with the accompanying drawings.

BRIEF DESCRIPTION OF THE DRAWINGS

In the drawings:

FIGS. 2A and 2B are respectively a bottom perspective view and exploded perspective view of a first embodiment of a signal pickup cartridge of the invention;

FIG. 3 is a bottom perspective view with parts cut away of the signal pickup device loaded with the signal pickup cartridge;

DETAILED DESCRIPTION

Figure 1:
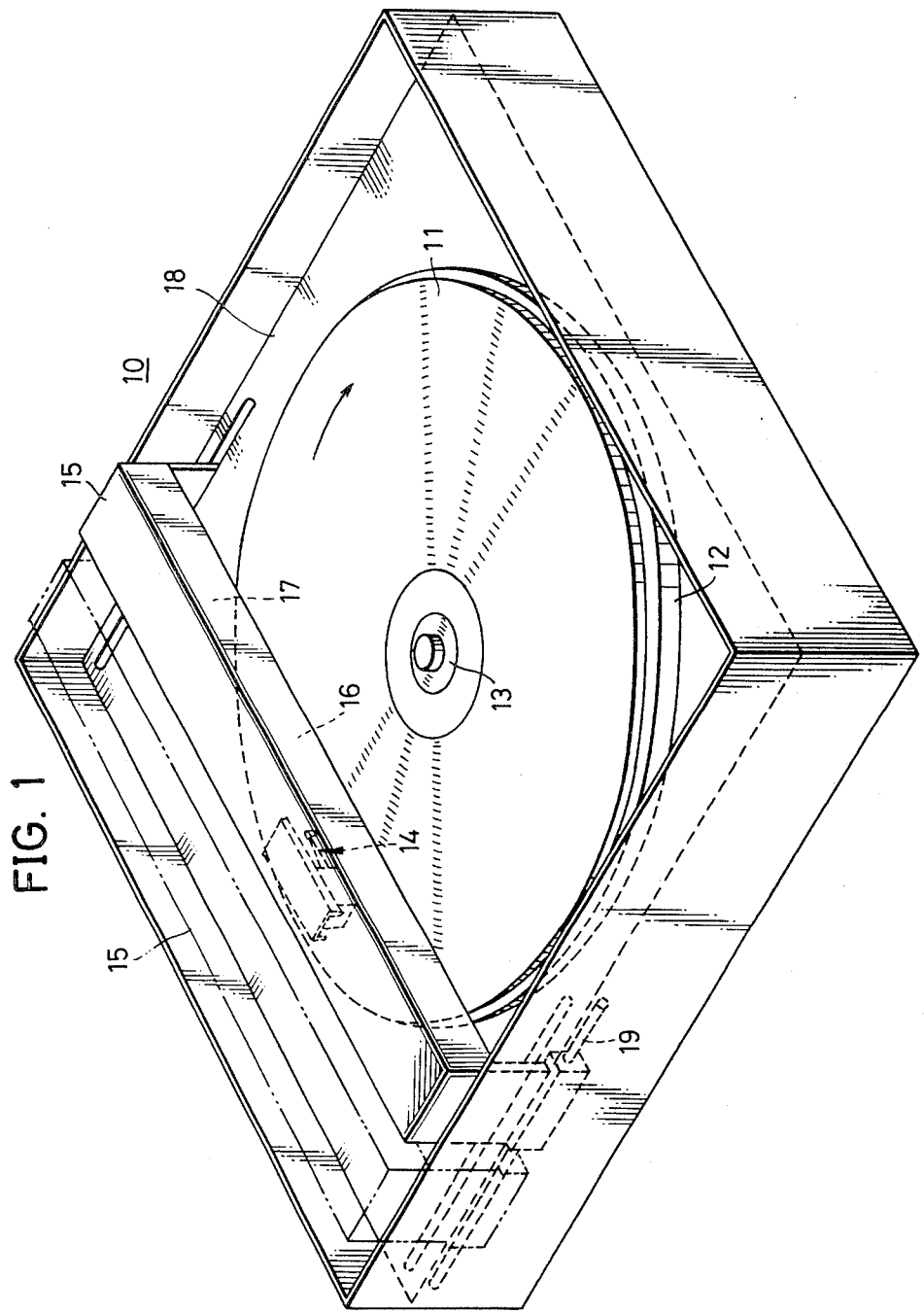
FIG. 1 is a general perspective view of one example of an apparatus for reproducing rotary recording mediums in which a signal pickup device employing a pickup cartridge according to the invention can be applied.

The general features of the exterior of a reproducing apparatus 10 for reproducing a rotary recording medium, in which a signal pickup device is applied, is illustrated in FIG. 1. In this apparatus 10, a rotary disc 11, constituting the rotary recording medium and having a video signal recorded thereon, is set on a turntable 12 and clamped thereon by a clamper 13 and is thus rotated unitarily with the turntable 12 at a rotational speed of 900 rpm., for example. On the disc 11, a video signal of two frames, that is, four fields, per revolution with spiral tracks is recorded with pits formed responsive to the information content of the signal.

The information signal, such as a video signal, is recorded on the disc 11 by the system shown in the U.S. patent application Ser. No. 785,095 entitled "Information Signal Recording and Reproducing System."

With respect to one track turn on the disc 11, pits of the first pilot signal and formed on one lateral side of the track as viewed in the track path direction (for example, on the right hand side in the direction of rotation), and pits of the second pilot signal are formed on the other side (left hand side) of the track. With respect to the adjacent track, the pits of the second pilot signal are formed on one side (right hand side) thereof as viewed in the track path direction, and on the other side (left hand side), the pits of the first pilot signal are formed. Thus, the positions at which the pits and the pits of the first and second pilot signals are formed are alternately reversed in the disc radial direction.

A signal pickup device 14 is mounted at a re-entrant cylindrical cavity resonator 16 provided within a carriage 15 and connected to a central conductor of the resonator. The central conductor is electro-magnetically connected to a high frequency oscillator 17 for producing an oscillation of frequency of 1 GHz, for example. This organization is well known. The carriage 15, which is disposed horizontally above the turntable 12, is guided at its ends by a pair of parallel horizontal guide bars 19 (only one shown) provided below a base plate 18. This carriage 15, driven by a driving mechanism (not shown), moves continuously in horizontal translation at a speed of the distance of one track pitch per revolution of the turntable 12 in synchronism with the rotation thereof. As a result of this movement of the carriage 15, a reproducing stylus of the signal pickup device 14 travels in translation relative to the disc 11 along the radial direction thereof and traces relatively the spiral track of the disc 11 undergoing rotation.

The first embodiment of the signal pickup cartridge according to the present invention is described with reference to FIGS. 2 and 3.

Referring to FIG. 3, a signal pickup device 20 comprises an actuator 21 for operating as a control drive part and a pickup cartridge 22 which is shown in FIG. 1. The actuator 21 has an internal organization shown in the U.S. Pat. No. 4,160,268, for example.

In FIG. 3, the signal pickup device 20 has a magnetic field forming structure 23 in which a ferromagnetic frame member 24, formed to bend into a "U" shape, has permanent magnet members 25 and 26 secured to the inner surface of each arm thereof and with U-shaped yoke 27 secured to the base thereof to be interposed between the permanent magnet members 25 and 26. The permanent magnet members 25 and 26 are magnetized so that their secured sides have the N poles and the opposite sides the S poles, whereby the yoke arms assume the N poles. Accordingly, the strong magnetic fields are formed between the permanent magnet member 25 and one yoke arm and between the permanent magnet member 26 and another yoke arm. No magnetic field is formed between the yoke arms.

A moving structure 28 comprises a pair of coils 29 and 30 wound in a rectangular shape. These coils 29 and 30 are secured to a rigid support plate 31 in mutually parallel and adjacent relationship, and are loosely fitted to the yoke arms.

A leaf spring 32 made of phosphor bronze, for instance, is supported at opposite sides by rubber support members and is stretched between distal ends of the arms of the frame member 24. This leaf spring 32 is formed with a pair of openings.

Pivot bearings 33 and 34 are fixed to the support plate 31 at parts near its opposite sides.

The frame member 24 is provided at its front with a rigid front plate 35, which is formed with elliptical openings extending laterally at positions corresponding to the pivot bearings 33 and 34. A magnet plate is bonded to the front plate 35 at its center part.

Referring to FIGS. 2 and 3, the pickup cartridge 22 has a bracket 42 mounted to a support plate 41. The bracket 42 is formed on one side surface of the vertical parts with a stepped groove 42a extending longitudinally. The magnet plate 43 is fitted into the groove 42a and a stepped part 42b serves as a guide for the magnet plate 44.

A cantilever 46 has at its distal end, the reproducing stylus 45. Two relatively long rods 46a and 46b are fixed to each other at their distal ends and are thereby formed in a V-shape. The rods 46a and 46b of the cantilever 46 have at their proximal ends, circular coneshaped pivots 47a and 47b made of hard material.

The rods 46a and 46b are fixed, through resiliently supporting parts 51a and 51b described hereinafter, to parts near opposite ends of a bridge member 48. A rectangular magnetic plate 44 is bonded to a rear surface of the bridge member 48. The magnet plates 43 and 44 are magnetized in their thickness direction.

In the pickup cartridge 22 assembled as shown in FIG. 2A, the magnet plates 43 and 44 attract each other to contact with their peripheral edges coinciding with each other, in their autonomous action, and the cantilever 46 is held stably. A lead wire 49 is connected at its one end to the electrode of the reproducing stylus 45 and at its other end to a terminal 50 on the bottom of the support plate 41.

Figure 4:
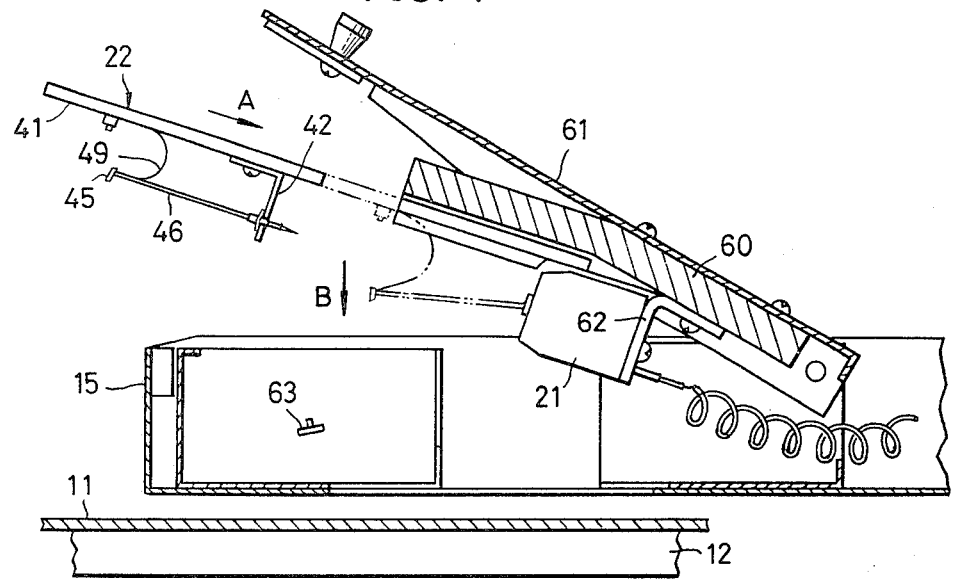
FIG. 4 is an elevational view, in section, showing the signal pickup device in a state where the signal pickup cartridge is to be loaded.
Figure 5:
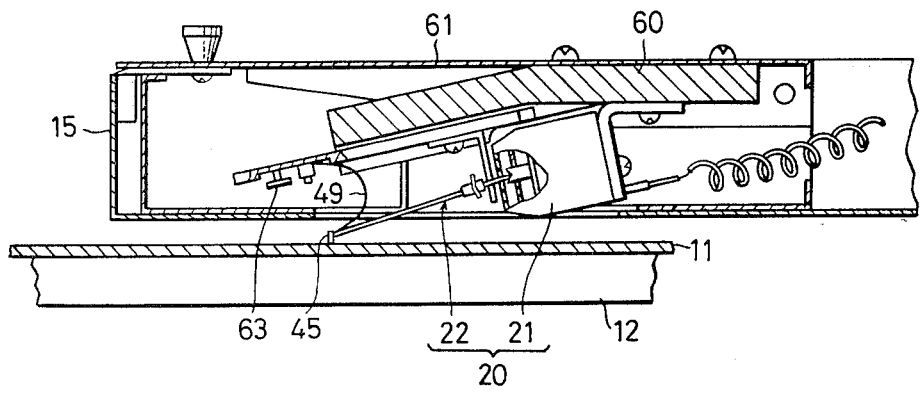
FIG. 5 is a longitudinal section of the signal pickup device in a disc reproducing state after the signal pickup cartridge has been loaded.

The pickup cartridge 22 is inserted and loaded to the actuator 21 as indicated in FIG. 4, and the signal pickup device 20 carries out a disc reproducing operation, while in a state indicated in FIG. 5.

Referring to FIG. 4, a support base 60 is screw fastened to a lid 61 hinged on a shaft of a carriage, and the actuator 21 is secured by way of a bracket 62 to the support base 60. The pickup cartridge 22 is loaded with the lid 61 in the opened state. The pickup cartridge 22 is inserted, in the arrow direction A, into the support base 60 in a state where the both lateral edges of the support plate 41 are engaged into grooves of the support base 60, and is loaded as indicated by two-dot chain line, in a state where the bracket 42 is attracted to contact with a magnet plate provided at a front plate of the actuator 21. With the pivots 47a and 47b in the state wherein they are received in the pivot bearings 33 and 34, the magnet 44 separates from and is attracted to the magnet 43. The pivots 47a and 47b are caused by the attractive force of the magnets 43 and 44 to be in pressing contact in the pivot bearings 33 and 34 with a specific force.

Whereupon this loading is completed, the cantilever 46 undergoes a rotation in the arrow direction B caused by a disposed relationship between the magnet plate 43 and the pivot bearings 33 and 34. As the cantilever 46 rotates, the proximal part thereof comes to abut against the side wall of the openings at the front plate of the actuator, whereby the rotation of the cantilever 46 is restricted at a position indicated by the two-dot chain lines. Therefore, the trouble that the lead wire 49 might be cut off does not occur.

When the lid 61 is closed, the terminal 50 is connected to a central conductor 63 of a re-entrant cylindrical cavity resonator, and further by manipulating the reproducing stylus elevating mechanism, the reproducing stylus 45 makes in contact with the disc 11.

When reproducing the disc, the moving structure 28 moves in response to the control signal current formed from the reproduced reference signal, and the tracking control and jitter compensation are carried out.

Figure 6A:
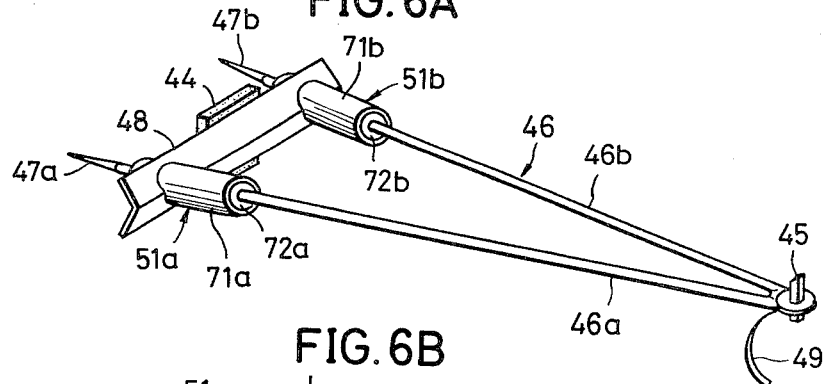
FIGS. 6A and 6B are respectively a perspective view of a cantilever assembly of the signal pickup cartridge shown in FIG. 4 and a vertical sectional side view of the essential part thereof.
Figure 6B:
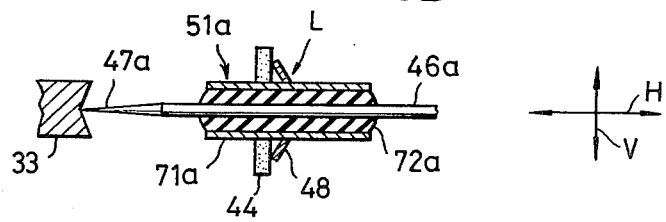

Next, the elastic support parts 51a and 51b elastically supporting the cantilever 46 constituting an essential part of the signal pickup cartridge of the invention will now be described in conjunction with FIGS. 6A and 6B. In FIGS. 6A and 6B, those parts which are the same as corresponding parts in FIGS. 2A and 2B are designated by like reference numerals. The description of such parts will be omitted at this point.

The elastic support parts 51a and 51b respectively comprise cylindrical members 71a and 71b which pass through and are fixed to a bridge member 48. Elastic members 72a and 72b, which are capable of absorbing vibration, are fitted into the interiors of these cylindrical members. The rods 46a and 46b of the cantilever 46, at their proximal or base parts are inserted through and supported by the elastic members 72a and 72b of the elastic support parts 51a and 51b.

It is desirable that the cylindrical members 71a and 71b be formed from a material of low weight and high mechanical strength such as, for example, an aluminum tubing which has been subjected to hardening treatment. For the elastic members 72a and 72b, a material such as rubber, for example, is used.

The securing of the elastic members 72a and 72b to the cylindrical members 71a and 71b may be accomplished by means of an adhesive or by pressing the outer peripheral surface of the elastic members 72a and 72b against the inner wall surface of the cylindrical members 71a and 71b.

With respect to the cantilever 46, the load part L comprising the cylindrical members 71a and 71b, the bridge member 48, and the magnet 44 is statically in the state of an integral structure by way of the elastic members 72a and 72b. For this reason, in the pickup cartridge of the present invention, there is no occurrence of an undesirable increasing of the contact force of the reproducing stylus against the disc surface as a consequence of the effect of the elastic members which can be considered in the case where elastic members are used as described hereinbefore.

Furthermore, the magnitude of the increase in the mass due to the addition of the cylindrical members 71a and 71b and the elastic members is in the order of a fraction (for example, ⅓) of the mass of the permanent magnet 44. Also, the position at which the cylindrical members 71a and 71b and the elastic members 72a and 72b are provided is in the vicinity of the rotatable support points (extremities of the pivots 47a and 47b) of the cantilever 46. For these reasons, the magnitude of the increase in the contact force of the reproducing stylus against the disc surface is very small, being of the order of 3 to 4 percent, for example, even when there is an increase in the mass due to the addition of the cylindrical members 71a and 71b and the elastic members 72a and 72b. It is apparent, therefore, that the static characteristics of the cantilever are not affected by the addition of the cylindrical members 71a and 71b and the elastic members 72a and 72b.

With the pickup cartridge 22 coupled to the actuator 21, an attraction force in the order of, for example, 5 to 10 grams (g.) acts between the permanent magnets 43 and 44. For this reason, a force of 5 to 10 g. acts, in the horizontal direction H as indicated in FIGS. 3 and 6B, between a part near the base or proximal parts of the rods 46a and 46b and the above mentioned load part L. Consequently, a deformation strain corresponding to this force is produced in the horizontal direction H in the elastic members 72a and 72b.

Furthermore, when the reproducing stylus 45 has descended onto the disc surface as shown in FIG. 5, a slight deformation strain is produced in the elastic members 72a and 72b, also in the vertical direction V indicated in FIG. 6B. Thus, deformation strains in two directions, that is, in the direction H of pressing contact of the pivots 47a and 47b against the pivot bearings 33 and 34 and in the direction V in which the reproducing stylus 45 contacts the disc surface with additional contact force, are produced in the elastic members 72a and 72b. As a result, the following-up characteristic of the cantilever is improved in a relatively high-frequency range as described hereinbelow.

Figure 7:
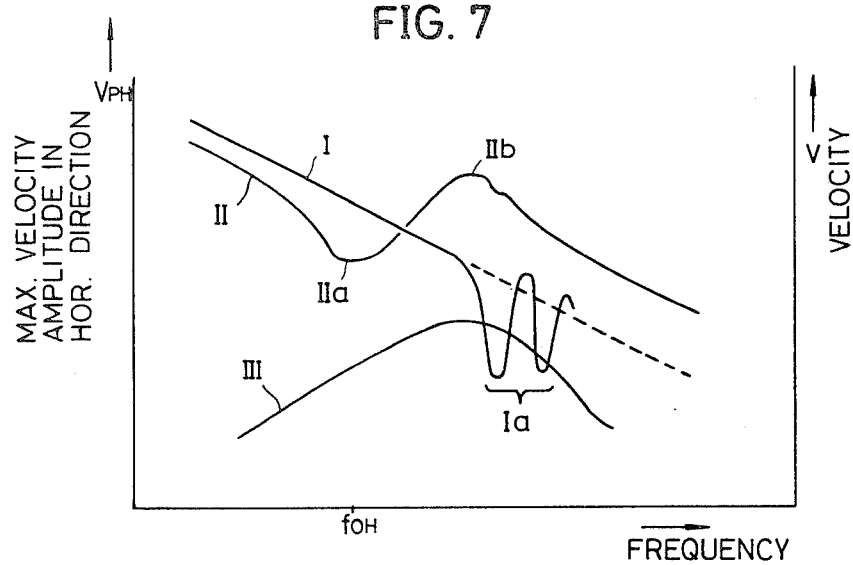
FIGS. 7 and 8 are views respectively illustrating the characteristics of the signal pickup devices.

First, the problem of the vibrational action of contacting and separating between the cantilever pivots and the pivot bearings will be considered in conjunction with FIG. 7. It should be mentioned here that FIG. 7 illustrates the case where, for the sake of simplification of description, the cantilever is assumed to be driven in its longutudinal direction (H direction in FIG. 6B) by the actuator 21. In this case, the maximum amplitude of the pivot bearings 33 and 34 is determined in accordance with the frequency of the control signal driving and controlling the pivot bearings. The pivot bearings 33 and 34 and the pivots 47a and 47b are in a state wherein they are not separated at the time when a control signal for jitter correction is supplied to the actuator 21. The pivot bearings 33 and 34 are driven in the H direction.

In FIG. 7, the abscissa represents frequency, while the ordinate represents the maximum velocity amplitude $V_{PH}$ in the H direction. This amplitude is the expression in velocity amplitude ($2\pi f \times$ amplitude) of the maximum amplitude which the pivot bearings can undergo with respect to the control driving frequency (f). In this case, the characteristic of the cantilever of a previously proposed pickup cartridge is indicated by curve I. The characteristic of the pickup cartridge according to the present invention is indicated by curve II. In the case where velocity V is represented by the ordinate, curve III indicates the velocity distribution with respect to the above mentioned control drive frequency of the pivot bearings.

The cantilever of the previously proposed pickup cartridge, as indicated by the maximum velocity amplitude characteristic curve I, exhibits a linear characteristic wherein there is decrease with 6 dB/oct with increasing frequency up to medium frequencies. In the higher frequency range, peaks and dips are exhibited as indicated by the characteristic curve portion Ia. Because the dips of this curve portion Ia drop below the velocity distribution characteristic curve III, a vibrational contact-separation phenomenon occurs between the pivots 47a and 47b and the pivot bearings 33 and 34. This may be considered to be attributable to vibration of the cantilever in the vertical direction V perpendicular to the H direction due to resonance in the delfective vibration mode.

In contrast, in the case of the cantilever of the pickup cartridge according to the present invention, a parallel resonance system is formed by the stiffness of the elastic members 72a and 72b and the masses of the cylindrical members 71a and 71b, the bridge member 48, and the magnet 44 when the load part L thereof is considered from the side of the cantilever 47. The resonance frequency of the parallel resonance system of the load part L exhibits different values for the horizontal H direction and the vertical V direction since the magnitude of the stiffness of the elastic members 72a and 72b in the longitudinal direction of the cantilever differs from that in the direction perpendicular thereto. The resonance frequency in the horizontal H direction of the load part L will herein be denoted by $f_{OH}$, and the resonance frequency in the vertical V direction thereof will be denoted by $f_{OV}$.

The characteristic of th pickup cartridge of the present invention when the cantilever thereof is driven in the H direction is as indicated by curve II in FIG. 7. More specifically, in the vicinity of the resonance frequency $f_{OH}$ in the H direction of the parallel resonance system due to the load part L, the mass of the load part L vibrates with a phase opposite to that of the motion of the cantilever in the horizontal direction. For this reason, the maximum velocity amplitude decreases as indicated at curve part IIa.

In the lower frequency which is below the curve part IIa, the cantilever and the load part L move unitarily. At this time, the effective mass of the cantilever is increased by the mass of the cylindrical members 71a and 71b and the elastic members 72a and 72b (for example, about 15 percent of the mass of the cantilever 46) added to the cantilever 46. For this reason, the maximum velocity amplitude on the lowfrequency side of the curve II is smaller than that of the curve I. Therefore, in the range of frequencies lower than the resonanace frequency $f_{OH}$, as is apparent from a comparison of curves I and II, the maximum velocity amplitude of the cantilever in the pickup cartridge of the present invention is smaller than that of the previously proposed pickup cartridge, but the curve II and the velocity distribution curve III are amply separated. For this reason, in the use of the pickup cartridge of the invention, a vibrational contact-separation phenomenon between the pivots 47a and 47b and the pivot bearings 33 and 34 does not arise.

If the curve of the maximum velocity amplitude of the cantilever is lower than the velocity distribution curve of the actuator, the vibrational contact-separation phenomenon between the pivots and the pivot bearings arises. For this reason, it is desirable that the resonance frequency $f_{OH}$ of the resonance system be so selected that, in the vicinity of the peak parts of the velocity distribution curve III, the maximum velocity amplitude curve II of the cantilever will be greatly separated from the curve III. Therefore, it is desirable that this resonance frequency $f_{OH}$ be selected at a frequency value in the vicinity of or lower than the frequency (a frequency near the part IIa of th curve II) at which the cantilever vibrates in the deflective vibration mode.

A peak is formed in the part IIb of the characteristic curve II in the frequency range of frequencies which are higher than the resonance frequency $f_{OH}$ as a consequence of series resonance due to the resonance system of the load part L and the mass of the cantilever.

The elastic members 72a and 72b are constructed so that there are large areas of contact between these elastic members and the rods 46a and 46b of the cantilever 46. The cylindrical members 71a and 71b are parts acting as a mass at the load part L. At the same time, the volume of the parts to undergo deformation in the elastic members 72a and 72b due to mutual vibration of these parts. The elastic members 72a and 72b function as elastic structures of great loss even in a relatively high frequency band of deflective vibration mode. For this reason, when the elastic members 72a and 72b are constructed in this manner, the sharpness Q of the resonant of the resonant system, forming the dip and peak of the parts IIa and IIb of the curve II, can be lowered. As a result, the dip of the part IIa can be easily set so that it will not intersect the curve III.

In the frequency range higher than the frequency of the peak part IIb of th curve II, the load part L does not move, and only the cantilever 46 moves. For this reason, the effective mass of the movable parts is reduced, for example, to about $\frac{1}{3}$. The pickup cartridge of the present invention carries out an operation exhibiting a maximum velocity amplitude which is greater than that of the previously proposed pickup cartridge indicated by the curve I in this frequency range.

Thus, as is apparent from a comparison of the curves I and II, the pickup cartridge, of the present invention, improves the characteristic at the high-frequency range, at which problems arise with respect to vibration of the deflective vibration mode of the cantilever. Particularly, there is no dip in the characteristic curve due to vibration of the deflective vibration mode. Therefore, the vibrational contact-separation phenomenon does not occur between the pivots and the pivot bearings.

Figure 8:
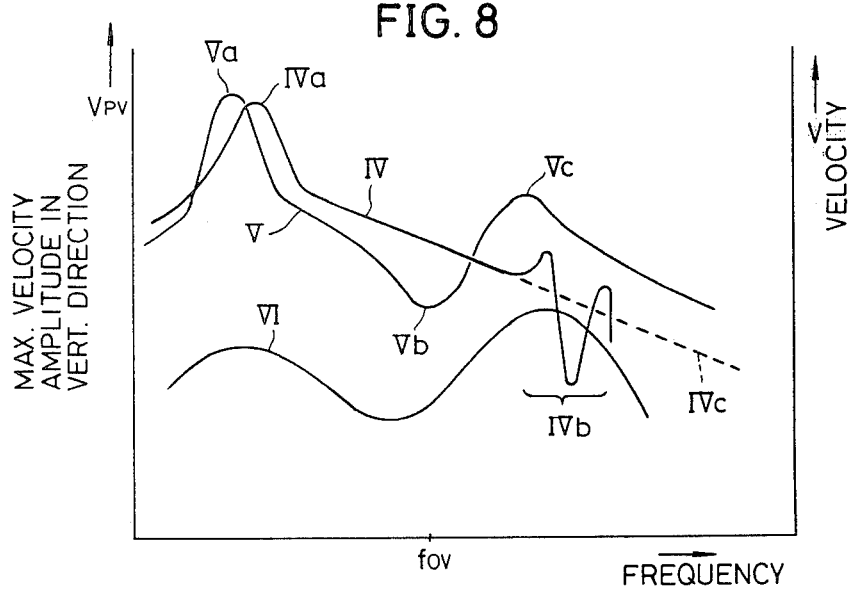

Next, the maximum velocity amplitude in the vertical direction will be considered. In the graph of FIG. 8, the abscissa represents frequency, while the ordinate represents maximum velocity amplitude $V_{PV}$ in the vertical direction which the reproducing stylus 45 can assume in a state wherein it is not separated from the disc surface. In this graph, the curves IV and V respectively indicate the maximum velocity amplitude characteristics of the cantilevers of the previously proposed pickup cartridge and that of the present invention. The curve VI indicates the velocity component in the vertical direction V of the cantilever due to surface oscillation of the disc, vibration arising from stick-slip of the reproducing stylus relative to the disc surface, control drive by the actuator, and other causes. In this case, the ordinate represents velocity.

With respect to vibration in the vertical direction, the cantilever undergoes rotational motion about the pivots. During this motion, the magnets 43 and 44 are equivalent to a single spring. For this reason, resonance occurs at a frequency of, for example, a number of tens of Hz as a result of the moment of inertia due to the cantilever and the load part L and the equivalent stiffness due to the magnets 43 and 44. As a consequence of this resonance, first peaks are formed at parts IV a and Va of the curves IV and V. This resonance is useful in improving the following-up characteristic in the vertical direction of the reproducing stylus.

The previously proposed pickup cartridge has a cantilever characteristic such that, as indicated by the curve IV, the maximum velocity amplitude decreases with increasing frequency in the range of frequencies which are higher than that at the peak part IVa. Furthermore, a large peak and a large dip are produced as indicaed at the part IVb because, at the frequency of this part IVb, the cantilever undergoes resonance in the deflective vibration mode.

The nature of the effect of the resonance due to the deflective vibration of the arm on the maximum velocity amplitude in the vertical direction of the reproducing stylus differs with whether the sliding contact between the reproducing stylus and the disc surface is a source of vibration or whether the actuator is a source of vibration.

More specifically, in the former case, the sliding contact between the reproducing stylus and the disc surface is a source of vibration. In the deflective vibration of the cantilever 46 the extreme end of the cantilever carrying the reproducing stylus 45 becomes a node. The mechanical impedance in the vertical direction as viewed from the reproducing stylus becomes high. The following-up characteristic becomes poor, and dips occur in the characteristic curve. On the other hand, in the deflective vibration of the cantilever, wherein the proximal or base end of the cantilever becomes the pivotal point, and the distal extremity of the cantilever bearing the reproducing stylus becomes a free end, the following-up characteristic increases, and peaks are produced. The part including those peaks and the dips is indicated by the part IVb of the curve IV.

On the other hand, in the latter case, the actuator is a source of vibration. Since the driving force due to the actuator 21 is very great, the velocity in the vertical direction of the reproducing stylus becomes high. The reproducing stylus readily separates from the disc surface, at a frequency at which the cantilever undergoes deflective vibration wherein its proximal base end becomes a pivotal point, and its distal extremity provided with the reproducing stylus becomes a free end.

Thus, depending on what the source of vibration is, the manner in which the peaks and dips of the characteristic curve of th cantilever appear differs. In the example shown in FIG. 8 of this characteristic, peaks and dips are shown at the part IVb.

In the characteristic of the pickup cartridge of the present invention indicated by the curve V, there is a peak as indicated at the part Va. The frequency of this peak is lower than the frequency of the peak indicated at the part IVa of the characteristic curve IV of the previously proposed pickup cartridge. The reason for this is that, in the pickup cartridge of the present invention, the load part L is added, whereby the moment of inertia is increased. Furthermore, at the resonance frequency $f_{OV}$ of the vibration in the vertical direction of the load part L, a dip appears as indicated at the part Vb in the characeristic curve V. This dip appears because, at the resonance frequency $f_{OV}$, the load part L resonates with a motion of a phase which is opposite to that of the motion of the cantilever. This dip has the effect of disturbing the motion of the cantilever and of impairing its following-up characteristic.

At a frequency higher than the above mentioned frequency $f_{OV}$, the characteristic curve V has a second peak at the part Vc. This second peak is produced by a series resonance due to the cantilever and the load part L. As described hereinbefore, the elastic members 72a and 72b function well as elastic structures of great loss also in the vertical direction in the high-frequency range. Accordingly, it is possible by means of these elastic members 72a and 72b to readily reduce the sharpness Q of the resonance of the resonance system causing the dip at the part Vb and the peak at the part Vc in the characteristic curve V. Therefore, the drop in the maximum velocity amplitude of the cantilever at the dip part Vb can be held to a degree which will not become a problem. The height of the peak part Vc, also, can be held to a suitable value.

In the range of frequencies higher than that of the peak part Vc, the load part L does not move, whereby only cantilever becomes the effective load. The maximum velocity amplitude of the cantilever in this frequency range is greater than that of the part IVc in the case where the characteristic curve of the cantilever of previously proposed pickup cantilever does not have the part IVb but, instead, decreases at 6 dB/oct as indicated by dotted line.

In the pickup cartridge according to the present invention, the resonance frequency $f_{OV}$ of the load part L is set at a value in the vicinity of the frequency at which the cantilever undergoes deflective vibration of maximum deflection of its free end about its proximal base end as a pivotal point. The load part L is caused to vibrate with a phase which is opposite that of the cantilever with respect to this deflective vibration of the cantilever. Thus, the load part L functions as a so-called dynamic damper, whereby the above mentioned deflective vibration is suppressed very effectively.

With respect to deflective vibration wherein the proximal base end and the distal free end of the cantilever become nodes, and the middle part of the cantilever becomes the deflected part, the elastic members 72a and 72b are deformed with the load part L assuming an immobile state. On the basis of this deformation, energy is consumed in the elastic members, and the deflective vibration of the cantilever is effectively damped. Furthermore, in the case where the resonance frequency $f_{OV}$ is set at a value lower than the frequency which gives rise to the above mentioned deflective vibration, there is no movement of the load part L with respect to the deflective vibration of the cantilever. Therefore, the deflective vibration is effectively suppressed.

When the maximum velocity amplitude $V_{PV}$ of the reproducing stylus in the vertical direction becomes a value less than that of the curve VI, the reproducing stylus separates from the disc surface. In the pickup cartridge of the present invention, however, the curve V is amply separated from the curve VI. Moreover, the dip due to the deflective vibration of the cantilever is amply small, whereby, in the desired frequency range, a good state of contact between the reproducing stylus and the disc surface is positively maintained.

Figure 9:
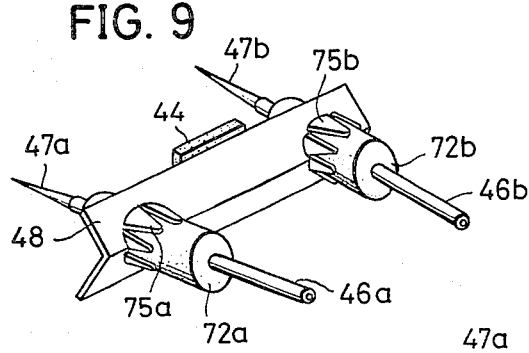
FIGS. 9, 10, and 11 are perspective views respectively showing the essential parts of the cantilever assemblies of the second, third, and fourth embodiments of the signal pickup cartridge of the present invention.

Other embodiments of the elastic support part of the pickup cartridge according to the invention will now be described in conjunction with FIGS. 9, 10, and 11. In the second embodiment of the invention illustrated in FIG. 9, a pair of spaced-apart holes with serrated peripheral edges are formed in the bridge member 48. The plurality of teeth 75a and 75b thus formed around the edges of these two holes are bent toward the free end of the cantilever. Elastic members 72a and 72b are inserted through these holes and are engaged and held by the teeth 75a and 75b. In this embodiment of the invention, cylindrical members 71a and 71b are unnecessary, whereby the construction is simple.

Figure 10:
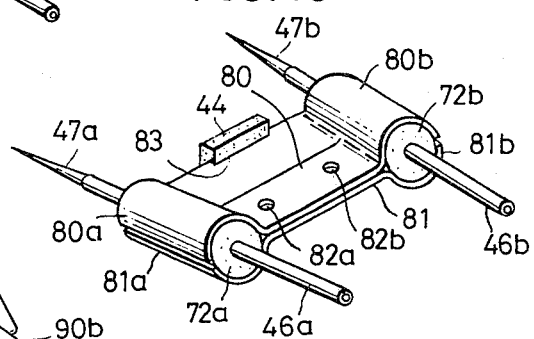

In the third embodiment of the invention shown in FIG. 10, a pair of clamping members 80 and 81 respectively having semicylindrical parts 80a, 80b and 81a, 81b formed at their ends are used instead of the bridge member 48 and the cylindrical members 71a and 71b in the first embodiment of the invention. These clamping members 80 and 81 are fabricated by press forming aluminum sheet blanks. A magnet 44 is fixed to the middle part of the clamping members 80 and 81 in a cutout part formed therein. Elastic members 72a and 72b are clamped respectively between the semicylindrical parts 80a, 81a and 80b, 81b of the clamping members 80 and 81, which are fastened to each other at their middle parts by screws in tapped holes.

Figure 11:
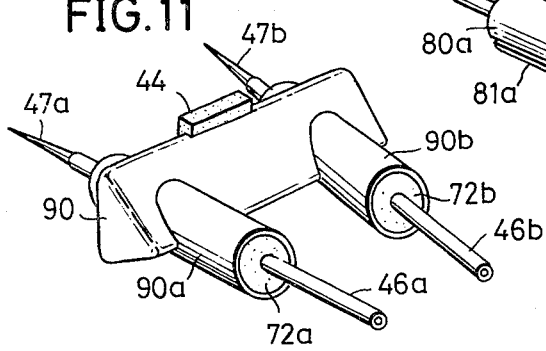

In the fourth embodiment of the invention shown in FIG. 11, a bridge member 90 has a pair of cylindrical parts 90a and 90b integral therewith and is formed from, for example, a light plastic material of high rigidity. Alternatively, this structure may be constructed by inserting cylindrical parts 90a and 90b formed from aluminum tubing through a bridge part 90 made of a plastic material and fixing these parts together. Elastic members 72a and 72b are inserted through and held in the interiors of the cylindrical parts 90a and 90b.

The features of function and meritorious effect of the above described second, third, and fourth embodiments of the invention are substantially the same as those of the first embodiment.

Further, this invention is not limited to these embodiments but variations and modifications may be made without departing from the scope of the invention.

What I claim is:

1. A signal pickup cartridge to be mounted in a signal pickup device having pivot bearings and an actuator driven by said pivot bearings in response to a control signal, said pickup cartridge comprising:

a cantilever having a reproducing stylus at its free end for tracing along a track which is formed on a rotary recording medium lying in a horizontal plane, said medium having an information signal recorded therealong, said stylus reproducing said information signal, said cantilever being supported in a swinging manner at a proximal base end thereof by said pivot bearings, in a manner making possible stylus displacement in the longtudinal direction thereof;

pressure contact means for holding said cantilever when the pickup cartridge means causing said proximal base end of the catnilever to be pressed into contact with the pivot bearing when the pickup cartridge is mounted in the pickup device;

an elastic member for absorbing vibration at one part of said pressure contact means, said elastic member holding the cantilever at a part near said proximal base end;

which further has a support plate fitted into said signal pickup device, and in which said pressure contact means comprises a first permanent magnet held by said support plate, a second permanent magnet for mutual attraction with said first permanent magnet, and a mounting member on which said second permanent magnet is mounted, and said elastic member is supported by said mounting member, said mounting member having a mounting part on which the second permanent magnet is mounted and a supporting part for supporting said elastic member, said supporting part being in the form of a hole formed in said mounting part and having a serrated peripheral edge, whereby a plurality of teeth are formed around the edge and are bent to constitute a holding member, and said elastic member is a cylindrical shape and is inserted through said hole and held by said teeth.

2. A signal pickup cartridge to be mounted in a signal pickup device having pivot bearings and an actuator driven by said pivot bearings in response to a control signal, said pickup cartridge comprising:

a cantilever having a reproducing stylus at its free end for tracing along a track which is formed on a rotary recording medium lying in a horizontal plane, said medium having an information signal recorded therealong, said stylus reproducing said information signal, said cantilever being supported in a swinging manner at a proximal base end thereof by said pivot bearings, in a manner making possible stylus displacement in the longitudinal direction thereof;

pressure contact means for holding said cantilever when the pickup cartridge is mounted in said signal pickup device, said contact means causing said proximal base end of the cantilever to be pressed into contact with the pivot bearing when the pickup cartridge is mounted in the pickup device;

an elastic member for absorbing vibration at one part of said pressure contact means, said elastic member holding the cantilever at a part near said proximal base end;

which further has a support plate fitted into said signal pickup device, and in which said pressure contact means comprises a first permanent magnet held by said supprt plate, a second permanent magnet for mutual attraction with said first permanent magnet, and a mounting member on which said second permanent magnet is mounted, and said elastic member is supported by said mounting member, said mounting member comprising a mounting part on which said second permanent magnet is mounted and a pair of plate members forming in combination a supporting part for supporting said elastic member.

3. A signal pickup cartridge to be mounted in a signal pickup device having pivot bearings and an actuator driven by said pivot bearings in response to a control signal, said pickup cartridge comprising:

a cantilever having a reproducing stylus at its free end for tracing along a track which is formed on a rotary recording medium lying in a horizontal plane, said medium having an information signal recorded therealong, said stylus reproducing said information signal, said cantilever being supported in a swinging manner at a proximal base end thereof by said pivot bearings, in a manner making possible stylus displacement in the longitudinal direction thereof;

pressure contact means for holding said cantilever when the pickup cartrige is mounted in said signal pickup device, said contact means causing said proximal base end of the cantilever to be pressed into contact with the pivot bearing when the pickup cartridge is mounted in the pickup device;

an elastic member for absorbing vibration at one part of said pressure contact means, said elastic member holding the cantilever at a part near said proximal base end;

which further has a support plate fitted into said signal pickup device, and in which said pressure contact means comprises a first permanent magnet held by said support plate, a second permanent magnet for mutual attraction with said first permanent magnet, and a mounting member on which said second permanent magnet is mounted, and said elastic member is supported by said mounting member, said cantilever comprising a pair of cantilever rods joined at respective ends thereof and spaced apart at the other ends thereof thereby to form a Vee-shaped bipod structure, said joined ends and said spaced apart ends being said distal free end and said proximal base end, respectively; said elastic member comprising a pair of rubber members of cylindrical shape through which said rods, at parts thereof near said proximal base end, are respectively inserted; and said mounting member at a middle part thereof supporting said second permanent magnet and having, at lateral sides thereof, supporting parts for respectively supporting said rubber members.

4. A signal pickup cartridge adapted to be detachably mounted in a signal pickup device having pivot bearings and a stylus actuator driven by said pivot bearings in response to a control signal, said pickup cartridge comprisin:

a cantilever having a reproducing stylus at its free end for tracing along a track which is formed on a rotary recording medium lying in a horizontal plane, said track having at least an information signal recorded therealong, said stylus reproducing said information signal, said cantilever being directly supported in a swinging manner at a proximal base end thereof by said pivot bearings in a manner making it possible for stylus displacement in the longitudinal direction, said cantilever being detachable from said pivot bearings;

a cylindrical elastic member through which said cantilever is inserted and supported, said elastic member being mounted on said cantilever at a part which is disposed at a position away from said pivot bearings, said elastic member absorbing vibration;

a holding member having a support in the form of a hollow cylinder for holding said elastic member therein to elastically support said cantilever; and magnetic pressure contact means for causing said proximal base end of the cantilever to be pressed into contact with the pivot bearings and for imparting to said reproducing stylus a pressure against said rotary recording medium when the pickup cartridge is mounted in the pickup device, said pressure contact means comprising a permanent magnet mounted on said holding member for exerting a magentic attractive force between said permanent magnet and another permanent magnet mounted on said pickup device when said pickup cartridge is mounted in the pickup device.

* * * * *